United States Patent [19]

Fong

[11] Patent Number: 4,731,419

[45] Date of Patent: Mar. 15, 1988

[54] ALKOXYLATED/CATIONICALLY MODIFIED AMIDE-CONTAINING POLYMERS

[75] Inventor: Dodd W. Fong, Naperville, Ill.

[73] Assignee: Nalco Chemical Company, Oak Brook, Ill.

[21] Appl. No.: 831,963

[22] Filed: Feb. 24, 1986

[51] Int. Cl.⁴ .............................................. C08F 8/00
[52] U.S. Cl. .............................. 525/328.2; 525/329.4; 525/379; 525/380
[58] Field of Search ............................ 525/329.4, 328.2

[56] References Cited

U.S. PATENT DOCUMENTS

| | | | |
|---|---|---|---|
| 4,192,784 | 3/1980 | Brown et al. | 525/329.4 |
| 4,297,226 | 10/1981 | Hunter | 525/329.4 |
| 4,326,969 | 4/1982 | Hunter | 525/329.4 |
| 4,482,682 | 11/1984 | Kudomi et al. | 525/329.4 |

Primary Examiner—Joseph L. Schofer
Assistant Examiner—Bernard Lipman
Attorney, Agent, or Firm—John G. Premo; Donald G. Epple; Anthony L. Cupoli

[57] ABSTRACT

Pendant amide-containing polymers may be modified in such a way to achieve substituted pendant amide groups described by the structure:

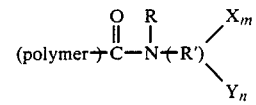

wherein:

R is chosen from the group consisting of hydrogen and lower alkyl ($C_1$-$C_4$) groups, $R^1$ is a multivalent hydrocarbonaceous bridging group containing from 1-20 carbon atoms, X is a tertiary amine or a quaternary ammonium salt functional group, Y is chosen from the group consisting of —OR''', and

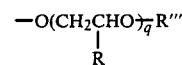

and mixtures thereof, and wherein R''' is chosen from the group consisting of hydrogen, alkyl groups, aryl alkyl, aryl groups and the like, q ranges from 0-50, m ranges from 0-24, n ranges from 0-24, provided that the sum of m plus n is at least 1.

Processes for achieving modified polymers having the above functional group is also disclosed.

12 Claims, No Drawings

ALKOXYLATED/CATIONICALLY MODIFIED AMIDE-CONTAINING POLYMERS

INTRODUCTION

The synthesis of water-soluble polymers has generally been limited to the use of certain vinyl monomers containing the various functional groups such as carboxylate, amide, sulfate, etc. Examples of these monomers are acrylic acid, acrylamide, and AMPS (2-acrylamido-2-methyl propane sulfonic acid). In addition, the synthesis of vinylic water-soluble polymers containing other functional groups has been limited from the point of view that only certain of these kinds of monomers are commercially produced.

As a result, the use of these water-soluble polymers is limited to the structures mentioned above or similarly modified structures thereof. It would, therefore, be an advance in the art if other water-soluble, vinylic, polymeric chemical structures could be synthesized on a vinylic polymeric backbone which structures would contain other functional groups, such as alcohol or ether groups, or for example ethoxylate groups, and which structures might also contain other functional groups which could enhance the use of these water-soluble polymers in certain applications such as dispersants in water treatment, scale inhibitors in natural and industrial waters, flocculants, coagulants, thickeners and the like.

It is, therefore, an object of this invention to create water-soluble polymers containing alkoxylate, tertiary or quaternary amine functional groups and mixtures thereof; and in addition, which polymers may also contain other functional groups which may be useful when applied to aqueous solutions or environments.

It is another object of this invention to develop a synthetic procedure which can generally be applicable to the synthesis of various types of water-soluble polymers containing the alcohol or alkoxylate functional groups with or without the additional presence of other functional groups which may be useful when these polymers are added to aqueous systems.

It is another object of this invention to synthesize and recover certain types of water-soluble polymers which polymers may contain other functional groups such as hydroxyl, ether, alkoxylated groups, and/or mixtures thereof, which polymers have not heretofore been known or used.

THE INVENTION

I have discovered a process for modifying water-soluble polymers containing pendant amide functional groups, such polymers primarily derived from acrylamide containing vinylic polymers/copolymers or from alkyl substituted acrylamide containing vinylic polymers or copolymers, and which polymers/copolymers are water soluble and contain pendant amide functional groups derived from acrylamide, methyl acrylamide, ethylacrylamide, and the like.

The water soluble pendant amide and/or substituted amide containing polymers and/or copolymers of my invention have a molecular weight of at least 500 and also have at least one mole percent (1%) of any original pendant amide group converted to pendant substituted amide groups represented by the structure:

wherein:

R' is a multivalent (capable of multiple covalent bonding to various and numerous functional groups) hydrocarbonaceous bridging group having from 1–20 carbon atoms, which bridging groups may be chosen from the group consisting of linear alkyl, branched alkyl, aryl, alkaryl, cyclic, and heterocyclic groups, and/or mixtures thereof;

X is represented by:

wherein
R'' is a hydrocarbonaceous functional group individually chosen, at each occurrence, from linear alkyl, branched alkyl, aryl, alkaryl, cyclic, heterocyclic groups, or two R'' groups taken together to form a ring, and alkoxyl groups represented by:

$$-(CH_2CHO)_q R''' ,$$
$$\phantom{-(CH_2}R$$

and mixtures thereof;
Y is individually chosen, at each occurrence, from the group consisting of —OR''', $$-O-(CH_2CHO)_q R''',$$
$$\phantom{-O-(CH_2}R$$

and mixtures thereof;
and wherein:
p is 0 and 1, provided that when p is 1, an electroneutralizing gegenion is equivalently present;
R is individually chosen, at each occurrence, from the group consisting of hydrogen or a lower alkyl ($C_1$–$C_4$) group;
R''' is individually chosen, at each occurrence, from the group consisting of hydrogen, linear alkyl, branched alkyl, aryl and alkaryl groups, cyclic and heterocyclic groups and mixtures thereof; and,
q is from 1–50;
m is from 0–24;
n is from 0–24;
provided that the sum, m+n, is at least one.

The process which I have discovered is a process that uses the equivalent of a transamidation reaction with any pendant amide group on a polymer using a chemical reactant represented by the structure:

Formula I

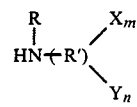

wherein R, R', X, Y, m and n have the meanings described above.

THE CHEMICAL REACTANT

The chemical reactant described above is primarily a reactive amino substituted compound which also contains the alkoxylate functional group, and/or the tertiary and quaternary amine functional groups, and mixtures thereof; and wherein the reactive amine functional group contains at least one active hydrogen substituted on the amino nitrogen. Although substituted amine compounds having both primary and secondary amines can react with pendant amide functionality on polymers via my transamidation reaction conditions to achieve modified pendant amide types of polymers, it is preferable that when a secondary amine is chosen to accomplish this modification of pendant amide containing polymers, that the alkyl group substituted on the reactive amino nitrogen contain no more than 4 carbon atoms, i.e. the alkyl substitution should be limited to methyl, ethyl, propyl and butyl functionality, and isomers thereof. Tertiary amines and quaternary ammonium functionality are not reactive in the transamidation reaction.

However, it is most preferred that the reactive amine substitution on the chemical reactant be a primary amino functional group. When a primary amino functional group is used to accomplish the transamidation reaction, the reaction easily proceeds so as to incorporate at least 2, and preferably from 25–60, mole percent of the chemical reactant used into the water-soluble polymer chain containing pendant amide groups, substituting therefore a substituted amide group containing an alkoxylate group, a tertiary amino group, a quaternary ammonium group, or mixtures thereof, for what was originally the pendant amide functionality.

In addition to the reactive amine substitution in the chemical reactant described above, this chemical reactant also contains either at least one alkoxylate group, at least one tertiary amino group, at least one quaternary ammonium group, or may contain admixtures of any or all of these functional groups.

In addition to the alkoxylate functional group and the reactive amine functional group, the chemical reactant may also contain other functional groups chosen from the group consisting of ether groups, tertiary amino and quaternary ammonium groups and mixtures thereof. Preferably, the chemical reactant is limited to contain a reactive primary amino group responsible for the transamidation reaction, at least one alkoxylate group which allows the formation of an alkoxylated water-soluble polymer, and/or a tertiary amino group, or a quaternary ammonium functional group, the presence of which, separately or in combination, may enhance the activity of water-soluble alkoxylate containing polymers synthesized by my process.

Most preferably, the chemical reactant contains a primary amine, one or more tertiary amino groups, and one or more alkoxylate groups which may contain from 1 to 50 repeating units from the structure:

wherein q=1–50 and R and R''' have the meanings above.

Several preferred species of the chemical reactant described above are demonstrated in the following formulations:

Formula II

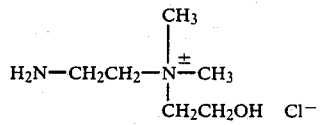 a

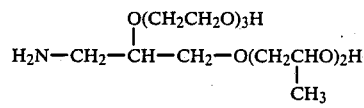 b

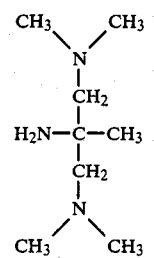 c

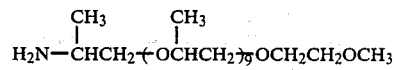 d

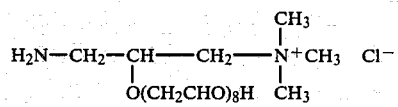 e

 f

THE PENDANT ACRYLAMIDE CONTAINING POLYMERS

The pendant acrylamide containing polymers are water-soluble polymers which have a general structure allowing the presence of a pendant amide group as demonstrated in Formula III:

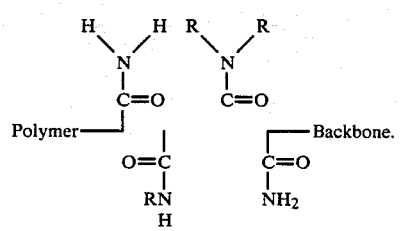

Formula III

In Formula III, as one can observe, the pendant amide group may be a primary amide, a secondary amide, or a tertiary amide compound and mixtures thereof. Preferably, to obtain reasonable conversions of these pendant amide groups to the alkoxylate, tertiary amino, or quaternary ammonium, or mixtures thereof, functional groups described above, the pendant amide group is a primary amide group.

The most likely water-soluble polymers containing pendant amide functionality which polymers are easily modified under the conditions of my transamidation reaction, are those water-soluble polymers described by Formula IV:

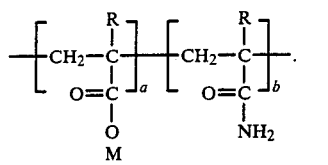

Formula IV

In Formula IV,

R is independently chosen, at each occurrence, from the group consisting of hydrogen, and lower alkyl groups containing from 1-4 carbon atoms;

M is independently chosen, at each occurrence, from hydrogen, lower ($C_1$-$C_4$) alkyl groups, alkali metals, alkaline earth metal and ammonium ions and mixtures thereof;

and a and b are integers having the following relationships:

a/b ranges between 0 to 100, and a+b is sufficient so as to provide a polymer having a molecular weight of at least 500. Preferably the sum, a+b, is sufficient to provide a molecular weight ranging between about 1,000-20,000,000.

As can be seen, the polymers described above may be homopolymers of acrylamide or its alkyl homologs, i.e. methacrylamide and the like, they may be copolymers of acrylamide with acrylic acid or its homologs such as methacrylic acid and the like, or they may be terpolymers and above with other monomers of a vinylic nature which contain acrylamide and acrylic acid, and their homologs such as methyacrylic acid, methacylamide, and the like.

THE CHEMICAL REACTION

The chemical reaction which is preferred to obtain the alkoxylated and/or cationic polymers of this invention is a reaction which can generally be referred to as a transamidation reaction. This reaction substitutes a reactive amine compound which may also contain other functional groups, such as the alkoxylate function groups, for the nitrogen portion of a pendant amide group contained on a polymeric backbone as described above. This transamidation reaction has been discovered to be a general reaction which can achieve, for example, the substitution of the reactive amino containing alkoxylated reactants for the amide nitrogen group of the pendant amide functionality of a water-soluble polymer, thereby obtaining unique alkoxylated/amide containing polymers.

The reaction conditions require that polymers containing pendant amide groups be dissolved or readily dispersed in a solvent which is a common solvent for the chemical reactant of the class described above. In other words, both the polymer which is to be modified and the chemical reactant should be soluble or dispersible in the same solvent system.

Common solvents which have been found useful in this reaction include, but are not limited to, water, dimethylformamide, dimethylsulfoxide, diglyme and admixtures thereof, and admixtures of these solvents, either singly or taken together with other miscible solvents such as ethanol, tertiary butanol, 2-methoxyethyl ether and the like.

A preferred solvent which is a common solvent for both the polymer containing pendant amide groups and the reactive amino group chemical reactants is water, particularly if the polymer containing pendant amide group is initially water-soluble, as in the case of most acrylamide containing vinylic polymers. Another preferred common solvent for my reaction is a water-in-oil emulsion wherein the dispersed water phase contains dissolved or dispersed therein both the polymers containing pendant amide groups and the chemical reactants described above.

After having dissolved the polymers containing pendant amide groups in the common solvent, preferably water, the chemical reactant can be added to obtain a solution or dispersion of amide containing polymer and the chemical reactants of this invention. Whether the polymer or the reactant is first added to the common solvent is of no consequence. This admixture is then added to or contained in a reaction vessel capable of withstanding a pressurized chemical reaction, for example, a Parr Bomb type of vessel. The vessel is enclosed and then heated to a temperature of at least 100° C., preferably at least 110° C., and most preferably to a temperature of at least 120° C. If the temperature is increased above 100° C., the vessel contents can expand and the pressure within the vessel can exceed one atmosphere and depending upon the solvent, the chemical reactants used and the like, can reach up to about 5 to 15 atmospheres, and possibly more. The pressure within the reaction vessel is a non-controlled variable and is controlled only to the extent that the vessel is enclosed, that a reaction temperature of at least 100° C. or higher is reached, and the vessel may contain solvents or reactants of more or less volatile nature, which solvents and reactants have vapor pressures of such a nature that pressure vessels are required at temperatures above 100° C.

Once the reaction vessel contents have reached at least 100° C., and preferably 110° C., the reaction is allowed to occur for at least 3 minutes at this temperature, and preferably for whatever length of time is necessary to accomplish a minimum of at least a 25 percent conversion of the added amount of chemical reactant. The chemical reactant is, of course, converted to a pendant substituted amide which is the product of the transamidation chemical reaction summarized above. If the polymer is a homopolymer of acrylamide, methacrylamide, or a copolymer of vinyl, amide containing, monomers such that no other pendant functional group is present besides amide functional groups, the condition of the reaction is such that at least some degree of amide hydrolysis may also occur in those reactions in which water or a water containing solvent is utilized. In such cases, the final polymer product may contain a carboxylate functional group in addition to the modified substituted amide groups and any unreacted starting amide groups left from the starting polymer.

Therefore, I have described the chemical reaction or process that accomplishes the synthesis of polymers having the structure:

Formula V

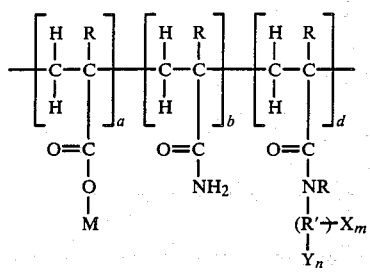

wherein
R is individually chosen, at each occurrence, from H and lower alkyl ($C_1$–$C_4$) groups;
M is individually chosen, at each occurrence, from hydrogen, lower alkyl ($C_1$–$C_4$) groups, alkali metal, alkaline earth metal, tertiary amines, and ammonium ion and mixtures thereof;
R' is a multi-covalent hydrocarbonaceous bridging group having from one to sixteen carbon atoms and being chosen from linear, branched, cyclic, aromatic and heterocyclic functional groups, and mixtures thereof;
X is chosen from

and, wherein R" is a hydrocarbonaceous functional group individually chosen, at each occurrence, from linear alkyl, branched alkyl, aryl, alkaryl, cyclic, heterocyclic groups, or two R" groups taken together to form a ring, and alkoxyl groups represented by:

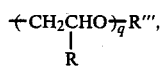

and mixtures thereof: and wherein
p is 0 or 1, provided that when p is 1, an electroneutralizing gegenion is present in an equivalent amount, and wherein
Y is

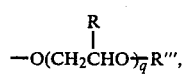

wherein R, q and R''' are defined above.
a, b, and d are integers with the following relationships;
a/b is from zero to 100
b/d is from 0.01 to 100
a/d is from zero to 100,
and the sum of a+b+d is sufficient to provide a molecular weight of at least 1000,
and the ratio of d:(a+b) is from 20:1 to 1:100;
and wherein
q ranges between 1 to 50, and
m ranges between 0 and 16, and
n ranges between 1 and 16, provided that when m is zero, the sum of m+n is between 1–30; which process comprises reacting, in a common solvent, at a temperature of at least 100° C.; in an enclosed, pressurized vessel;

A. a polymer having a molecular weight of at least 500, and having pendant amide functional groups, which polymer is represented by the structure:

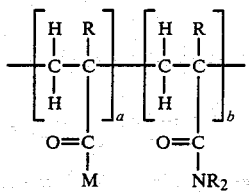

wherein R, M, a, b have the same meanings as above; with,

B. a chemical reactant having the structure:

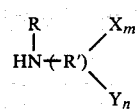

wherein R, R', X, Y, m and n, have the meanings above; and wherein the mole ratio of chemical reactant to pendant amine groups ranges between about 5:1 to about 1:100; and the reaction occurs for an effective amount of time to accomplish at least a 25 percent conversion of chemical reactant to water-soluble substituted amide containing polymer; and then recovering the water-soluble substituted amide containing polymer.

Polymer recovery may be accomplished in several ways known to the person familiar with the art. For example, the polymers may be precipitated by addition of precipitating solvents, or non-solvents, to the reaction mixture. For example, methanol or acetone may be added to the reaction mixture either as is or after concentration by distillation or vacuum distillation to precipitate the polymers. The polymers may also be recovered by vacuum distillation of solvent and unreacted chemical reactant from the reaction product mixture. The polymers may also be recovered by gel permeation chromatographic techniques. However, the polymers are principally recovered simply as a solution in the common solvent used to perform the transamidation reaction, and used as such. Depending on polymer characteristics, such as degree of substitution, type of substitution, molecular weight, and the like, the polymers may be used as flocculants, coagulants, dispersants, slurry stabilizers, collectors, retention aids, dewatering aids, and the like.

Preferably, my process is a method to synthesize water-soluble alkoxylated polymers having randomly repeated mer units represented by the formula:

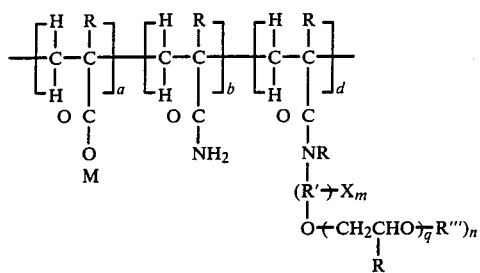

wherein
R is individually chosen, at each occurrence, from H and lower alkyl ($C_1$-$C_4$) groups;
M is individually chosen, at each occurrence, from hydrogren, lower alkyl ($C_1$-$C_4$) group, alkali metal, alkaline earth metal, tertiary amines, quaternary ammonium and ammonium ions and mixtures thereof;
R' is a multi-covalent hydrocarbonaceous bridging group having from one to sixteen carbon atoms and being chosen from linear alkyl, branched alkyl, cyclic, aromatic, heterocyclic, and mixtures thereof, functional groups;
X is chosen from

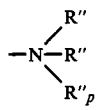

and mixtures thereof;
wherein
R" and p have the meanings above, and
R''' has the meanings described above;
and wherein:
a, b, and d are integers with the following relationships;
 a/b is from zero to 100
 b/d is from 0.01 to 100
 a/d is from zero to 100,
 and the sum of a+b+d is sufficient to provide a molecular weight of at least 1,000,
 and the ratio of d:(a+b) is from 20:1 to 1:100;
and wherein
n and m both range between 0 and 16, and the sum, m+n, is at least 1, and
q ranges between 0 and 50;
which process comprises reacting, in a common solvent, at a temperature of at least 100° C.:
A. a polymer having a molecular weight of at least 500, and having pendant amide functional groups, and represented by the structure:

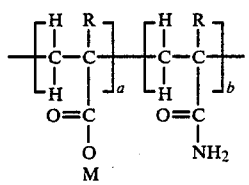

wherein R, M, a, b have the same meanings as above; with
B. a chemical reactant having the structure:

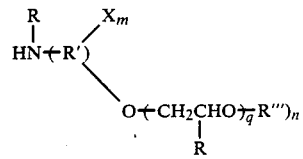

wherein R, R', R''', X, m, n and q have the meanings above; and wherein the mole ratio of chemical reactant to pendant amide groups ranges between about 5:1 to about 1:100; and wherein the reaction occurs for an effective amount of time to accomplish at least a 25 mole percent conversion of chemical reactant to water-soluble alkoxylated polymer; and then recovering the water-soluble alkoxylated polymer.

Most preferably, my process is a method for the synthesis of water-soluble alkoxylated polymers represented by the formula:

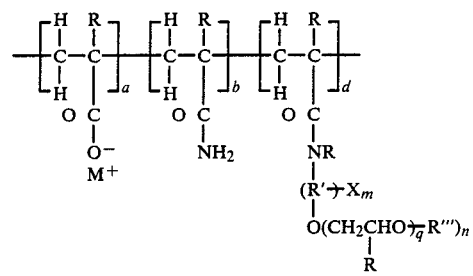

wherein
R is individually chosen, at each occurrence, from hydrogen and $C_1$ to $C_4$ lower alkyl groups;
M is individually chosen, at each occurrence, from hydrogen, alkali metals, and ammonium ions, and mixtures thereof;
R' is chosen from multi-covalent, branched alkyl, linear alkyl or cyclic hydrocarbonaceous bridging groups having from one to eight carbon atoms;
X is chosen from

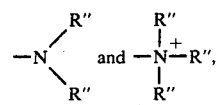

and mixtures thereof;
n ranges between 1 to 6;
m ranges between 0 to 6;
q ranges between 1 to 25; and
wherein
R" is individually chosen, at each occurrence, from the group consisting of lower ($C_1$-$C_4$) groups, and alkyoxylate groups represented by:

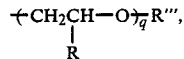

and
R''' is individually chosen, at each occurrence, from hydrogen, linear or branched alkyl groups, aryl groups, alkaryl groups, cyclic groups and mixtures thereof;
and wherein:
a, b, and d are integers with the following relationships:

a/b ranges from 0 to 100,
a/d ranges from 0 to 100,
b/d ranges from 0.01 to 100, and
the ratio d:(a+b) is between about 5:1 to about 1:25, and wherein the occurrence of mer units of a, b, and d is random and the sum of a+b+d will achieve a molecular weight of at least 1000, preferably at least 2000, and most preferably between about 1000-20,000,000; which process comprises reacting, in an aqueous solvent:

A. a polymer having pendant amide functional groups and represented by the structure:

$$\left[-CH_2-\underset{\underset{O}{\underset{|}{O=C}}}{\overset{R}{\underset{|}{C}}}-\right]_a \left[-CH_2-\underset{\underset{NH_2}{\underset{|}{O=C}}}{\overset{R}{\underset{|}{C}}}-\right]_b$$
M wherein R, M, a, and b have the meanings above and wherein the sum of a+b achieves a molecular weight of at least 500; and B. a chemical reactant having the structure:

$$H_2N+R'\rightarrow+O(CH_2CH_2O)_q R''')_n$$
$$|$$
$$X_m$$

wherein R', R''', M, X, m, n and q have the meanings above; under the following reaction conditions:

I. a reaction temperature of at least 100° C. and preferably at least 110° C.;
II. a reaction time of at least ¼ hour and preferably at least ½ hour;
III. a mole ratio of chemical reactant to polymer ranging between about 2:1 to about 1:50;
IV. a pressure ranging from atmospheric pressure to 35 times atmospheric pressure, or more;

thereby achieving the synthesis of the alkoxylated polymers described above, and then recovering the substituted/alkoxylated amide containing polymers.

It is particularly of interest that my synthetic procedures permit the synthesis of an alkoxylated polymer represented by:

$$\left[-CH_2-\underset{\underset{\underset{M^+}{\underset{|}{O^-}}}{\underset{|}{O=C}}}{\overset{R}{\underset{|}{C}}}-\right]_a \left[-CH_2-\underset{\underset{NH_2}{\underset{|}{O=C}}}{\overset{R}{\underset{|}{C}}}-\right]_b \left[-CH_2-\underset{\underset{\underset{R}{\underset{|}{O(CH_2CHO)_q R'''}}}{\underset{|}{\underset{(R'\rightarrow+NR_2'')_m}{\underset{|}{NH}}}}}{\underset{|}{\underset{|}{O=C}}}{\overset{R}{\underset{|}{C}}}-\right]_d$$

wherein:
R is individually chosen, at each occurrence, from the group hydrogen, methyl and ethyl groups;
M is individually chosen, at each occurrence, from the group hydrogen, sodium, potassium, ammonium ions and mixtures thereof;
R' is linear or branched, multi-covalent alkylene bridging group havng from 1 to 6 carbon atoms;
R'' is a lower alkyl ($C_1$-$C_4$) group, or an alkoxylate group represented by $$+CH_2CHO)_q R''$$
$$|$$
$$R$$

R''' is individually chosen, at each occurrence, from hydrogen and lower alkyl ($C_1$-$C_4$) groups, and
m is from 0 to 3;
n is from 1 to 3;
q is from 1 to 10; and
a, b, and d are integers having the relationships:
a/d is from 0 to 50,
a/b is from 0 to 50,
b/d is from 0.1 to 20,
d:(a+b) is from 5:1 to 1:10, and wherein
the sum of a+b+d is sufficient to provide a molecular weight of at least 1,000; which process comprises the reaction, in an aqueous solvent, for at least 0.1 hour at a temperature of at least 110° C., in a pressure controlling reactor, of the ingredients:

A. a reactant:

$$H_2N+R'\underset{\searrow}{\overset{\nearrow X_m}{}}$$
$$O(CH_2CHO)_q R''')_n$$
$$|$$
$$R$$

wherein R, R', R''', X, m, n and q have the above meanings; and

B. a water-soluble vinyl polymer having pendant amide groups represented by:

$$\left[-CH_2-\underset{\underset{O}{\underset{|}{O=C}}}{\overset{R}{\underset{|}{C}}}-\right]_a \left[-CH_2-\underset{\underset{NH_2}{\underset{|}{O=C}}}{\overset{R}{\underset{|}{C}}}-\right]_b$$
M wherein R, M, a, and b have the above meanings; and wherein the mole ratio of reactant to pendant amide groups ranges between about 2:1 to about 1:5; and then recovering the alkoxylated polymer.

To further illustrate my invention, I provide the following examples.

EXAMPLE I

A mixture of poly[acrylic acid (25 mole percent)-acrylamide (75 mole percent)] (31.5% actives, 63 g), and Jeffamine M-600 (106.1 g) was heated in a 600 ml Parr reactor at 150° C. for seven (7) hours. The product was characterized by L.C. and C13 NMR methods. L.C. analysis of the residual Jeffamine M-600 showed that 69.5% of the amine charged reacted and thus, the polymer contained 13.9 mole percent N-alkoxylated amide. (Jeffamine M-600 is a trademark of *Texaco Chemical Company* and is used to describe a chemical reactant having primarily the chemical formula:

$$CH_3O(CH_2CH_2O)+CH_2CHO)_8 CH_2CH-NH_2$$
$$\phantom{CH_3O(CH_2CH_2O)+}|\phantom{CH_2CHO)_8 CH_2CH-}|$$
$$\phantom{CH_3O(CH_2CH_2O)+}CH_3\phantom{CH_2CHO)_8} CH_3$$

EXAMPLE II

A mixture of poly[acrylic acid (25 mole percent)acrylamide (75 mole percent)] (31.5% actives, 80 g) and Jeffamine M-1000 (70.7 g) was heated in a 300 ml Parr reactor at 150° C. for seven (7) hours. The product was characterized by L.C. and C13 NMR methods. L.C. analysis of the residual Jeffamine M-1000 showed that 74.4% of the amine charged reacted and thus, the polymer contained 14.9 mole percent N-alkoxylated amide. (Jeffamine M-1000 is a trademark of *Texaco Chemical Company* and is used to describe a chemical reactant having primarily the chemical formula:

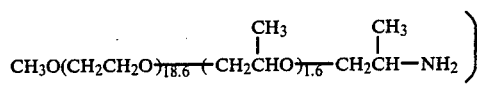

EXAMPLE III

A mixture of poly[acrylic acid (25 mole percent)acrylamide (75 mole percent)] (31.5% actives, 129 g) and Jeffamine M-360 (41 g) was heated in a 300 ml Parr reactor at 150° C. for seven (7) hours. The product was characterized by L.C. and C13 NMR methods. L.C. analysis of the residual Jeffamine M-360 showed that 56% of amine charged reacted and thus, the polymer contained 11 mole percent N-alkoxylated amide. (Jeffamine M-360 is a trademark of *Texaco Chemical Company* and is used to describe a chemical reactant having primarily the chemical formula:

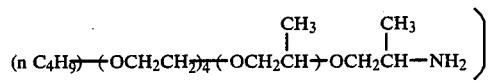

EXAMPLE IV

A solution of poly[acrylic acid (25 mole percent)acrylamide (75 mole percent)] (27.5% actives, 150 g), 1-amino-2,3-propanediol (10.6 g) was heated in a 300 ml Parr reactor at 150° C. for four (4) hours. The product was characterized by L.C. and C13 NMR methods. The molecular weight of the polymer was found to be 14,600. L.C. analysis of the residual 1-amino-2,3-propanediol showed that 92% of the amine charged reacted and thus, the polymer contained 18.6 mole percent N-(2,3 dihydroxy)propylamide.

EXAMPLE V

A solution of poly[acrylic acid (50 mole percent)acrylamide (50 mole percent)] (31.5% actives, 150 g), 1-amino-2,3-propanediol (12 g) was heated in a 300 ml Parr reactor at 150° C. for four (4) hours. The product was characterized by L.C. and C13 NMR methods. The molecular weight of the polymer was found to be 76,600. L.C. analysis of the residual 1-amino-2,3-propanediol showed that 92% of the amine charged reacted. The composition of the polymer was estimated to be 50 mole percent acrylate, 25 mole percent acrylamide, 18.3 mole percent N-(2,3-dihydroxy)propylamide, and 6.7 mole percent of a cyclic amide, represented by the structure:

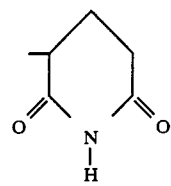

EXAMPLE VI

A solution of poly[acrylic acid (25 mole percent)acrylamide (75 mole percent)] (27.5% actives, 150 g), tris(hydroxy methyl)amino methane (14 g) was heated in a 300 ml Parr reactor at 150° C. for four (4) hours. The product was characterized by L.C. and C13 NMR methods. The molecular weight of the polymer was found to be 11,600. L.C. analysis of the residual tris(hydroxy methyl)amino methane showed that only 14% of the amine charged reacted and thus, the polymer contained about 3 mole percent of the secondary amide.

EXAMPLE VII

A solution of poly[acrylic acid (50 mole percent)acrylamide (50 mole percent)] (31.5% actives, 150 g) 2-amino-2-methyl-1,3-propandiol (13.9 g) was heated at 150° C. in a 300 ml Parr reactor for four (4) hours. The product was characterized by L.C. and C13 NMR methods. The molecular weight of the polymer was found to be 16,000. Residual amine was determined by L.C. methods. The composition of the polymer was estimated to be 75 mole percent acrylate, 15 mole percent acrylamide, 3 mole percent secondary amide, and 7 mole percent cyclic imide.

EXAMPLE VIII

The reaction conditions were similar to those employed in Example I. In this particular case, the finished polymer contained 7.6 mole percent of the acrylamide groups converted to the N-(1,1-dimethyl-2-hydroxyethyl)acrylamide groups. In addition, the following polymers would be expected to be synthesized if acrylamide containing polymers were reacted according to the procedures described above with the following chemical reactants: The anticipated products are described in Table I. In this table, AA means acrylic acid mer unit (or its salts or esters); AcAm means acrylamide mer units, and a, b and d have the the meanings above. T indicates any terminal end group from any free radical catalyst, or from any reaction which would lead to deactivation of a polymer propagating radical, such reaction being disproportionation, hydrogen abstraction, coupling, and the like.

| Starting Polymer | Starting Chemical Reactant | Anticipated Product Polymer |
|---|---|---|
| T⫟CH₂—CH⫠ᵦT<br>O=C<br>NH₂ | H₂N—CH₂CH₂<br>O(CH₂CH₂O)₁₂H | ⫟CH₂—CH⫠ₐ⫟CH₂—CH⫠ᵦ⫟CH₂—CH⫠_d<br>O=C  O=C  O=C<br>O⁺   NH₂   NH<br>M⁻           CH₂<br>H⫟OCH₂CH₂)₂O—CH₂ |
| T⫟CH₂—CH⫠ᵦT<br>O=C<br>NH₂ | OCH₂CH₂OH<br>H₂N—CH₂CH₂CH₂CH₂CH₂ | ⫟AA⫠ₐ⫟AcAm⫠ᵦ⫟CH₂—CH⫠_d<br>O=C<br>NH<br>CH₂—CH₂—CH₂—CH₂—CH₂<br>HOCH₂CH₂—O |
| T⫟CH₂—CH⫠ᵦT<br>O=C<br>NH₂ | CH₃  CH₃<br>N<br>H₂N—CH₂—CH₂—CH<br>O(CH₂CHO)₂H<br>CH₃ | ⫟AA⫠ₐ⫟AcAm⫠ᵦ⫟CH₂—CH⫠_d<br>C=O<br>NH<br>CH₂—CH—CH₂<br>H(OCHCH)₂—O  N<br>CH₃  CH₃ CH₃ |
| T⫟CH₂—CH⫠ᵦT<br>O=C<br>NH₂ | H₂N—⬡—OCH₂CH₂OH<br>N⁺CH₃<br>CH₃ | ⫟AA⫠ₐ⫟AcAm⫠ᵦ⫟CH₂—CH⫠_d<br>O=C<br>NH<br>⬡  CH₃<br>N<br>CH₃<br>O<br>CH₂CH₂OH |
| ⫟AA⫠ₐ⫟AcAm⫠ᵦ | CH₂CH₂OH<br>N⁺(CH₃)₂Cl⁻<br>HN—CH₂CH₂CHCH₂<br>CH₃  O⫟CH₂CH₂O⫠₄H | ⫟AA⫠ₐ⫟AcAm⫠ᵦ⫟CH₂—CH⫠_d<br>O=C<br>N—CH₃<br>CH₂—CH—CH₂—CH₂<br>H⫟OCH₂CH₂)₄O   N⁺(CH₃)₂Cl⁻<br>CH₂CH₂OH |
| [AA⫠ₐ⫟AcAm⫠ᵦ | CH₃<br>HN—⬡—NCH₂CH₂OCH₂CH₂OH | ⫟AA⫠ₐ⫟AcAm⫠ᵦ⫟CH₂—CH⫠_d<br>O=C<br>N<br>⬡<br>N—CH₃<br>CH₂CH₂OCH₂CH₂OH |
| ⫟AcAm⫠ᵦ | H₂N—⬡—CH₂<br>O(CH₂CH₂O)₃H | ⫟AA⫠ₐ⫟AcAm⫠ᵦ⫟CH₂—CH⫠_d<br>O=C<br>NH<br>⬡<br>H⫟OCH₂CH₂)₃O—CH₂ |

-continued

| Starting Polymer | Starting Chemical Reactant | Anticipated Product Polymer |
|---|---|---|
| $\text{-}(\text{AcAm})_b\text{-}$ | $\text{H}_2\text{N-CH}_2\text{-}\underset{\underset{\text{CH}_2\text{OH}}{\|}}{\overset{\overset{\text{CH}_3}{\|}}{\text{C}}}\text{-CH}_2\text{O}(\text{CH}_2\text{CH}_2\text{O})_2\text{H}$ | $[\text{AA}]_a\text{-}(\text{AcAm})_b\text{-}(\text{CH}_2\text{-CH})_d$<br>with pendant $\text{C=O}$, $\text{CH}_2\text{OH}$, $\text{H-(OCH}_2\text{CH}_2)_2\text{OCH}_2\text{-C(CH}_3\text{)-CH}_2\text{-NH}$ |
| $\text{-}(\text{AcAm})_b\text{-}$ | $\text{H}_2\text{N-CH-CH}_2\text{O}(\text{CH}_2\text{CH}_2\text{O})_5\text{H}$<br>$\|$<br>$\text{CH}_2\text{N-(CH}_2\text{CH}_2\text{O})_5\text{H}$<br>$\|$<br>$\text{CH}_3$ | $\text{-}[\text{AA}]_a\text{-}(\text{AcAm})_b\text{-}(\text{CH}_2\text{CH})_d$<br>$\text{C=O, NH, CH}_3$<br>$\text{H-(OCH}_2\text{CH}_2)_5\text{N-CH}_2\text{-CH}$<br>$\text{CH}_2\text{O}(\text{CH}_2\text{CH}_2\text{O})_5\text{H}$ |
| $\text{-}(\text{AcAm})_b\text{-}$ | $\text{H}_2\text{N-CH}_2\text{-}\langle\text{C}_6\text{H}_4\rangle\text{-O-CH}_2\text{CH}_2\text{OH}$ | $[\text{AA}]_a\text{-}(\text{AcAm})_b\text{-}(\text{CH}_2\text{-CH})_d$<br>$\text{C=O, -O-}\langle\text{C}_6\text{H}_4\rangle\text{-CH}_2\text{-NH}$<br>$\text{CH}_2\text{CH}_2\text{OH}$ |
| $\text{-}(\text{CH}_2\text{-CH})_x\text{-}(\text{AcAm})_b\text{-}$<br>$\|$<br>$\text{O=C}$<br>$\|$<br>$\text{O}$<br>$\|$<br>$\text{CH}_3$ | $\text{H}_2\text{N-CH}_2\text{CH}_2\text{OCH}_2\text{CH}_2\text{OH}$ | $\text{-}(\text{CH}_2\text{-CH})_x\text{-}[\text{AA}]_a\text{-}(\text{AcAm})_b\text{-}(\text{CH}_2\text{-CH})_d$<br>$\text{O=C, O, CH}_3$ and $\text{C=O, NH, (CH}_2)_2, \text{HOCH}_2\text{CH}_2\text{-O}$ |
| $\text{-}(\text{AcAm})\text{-}$ | $\text{H}_2\text{N-CH}_2\text{-O(CH}_2\text{CHO)}_2\text{H}$<br>$\|$<br>$\text{CH}_3$ | $[\text{AA}]_a\text{-}(\text{AcAm})_b\text{-}(\text{CH}_2\text{-CH})_d$<br>$\text{CH}_3, \text{C=O}$<br>$\text{H-(OCHCH}_2\text{O)}_2\text{CH}_2\text{-N}$ |
| $\text{-}(\text{AcAm})_b\text{-}$ | $\text{H-N-CH}_2\text{CH}_2\text{-N}^+(\text{CH}_3)_3\text{Cl}^{(-)}$<br>$\|$<br>$\text{CH}_2\text{CH}_2\text{O(CH}_2\text{CH}_2\text{O)}_2\text{H}$ | $[\text{AA}]_a\text{-}(\text{AcAm})_b\text{-}(\text{CH}_2\text{-CH})_d$<br>$\text{C=O}$<br>$\text{H(OCH}_2\text{CH}_2)_2\text{O-CH}_2\text{CH}_2\text{-NCH}_2\text{CH}_2\text{-N}^+(\text{CH}_3)_3\text{ Cl}^-$ |
| $\text{-}(\text{AcAm})_b\text{-}$ | $\text{H-N}\begin{Bmatrix}\text{CH}_2\text{CH}_2\text{CH}_2\text{-N(CH}_3)_2\\\text{CH}_2\text{CHCH}_2\text{-N(CH}_3)_2\\\text{O(CH}_2\text{CH}_2\text{O)}_6\text{H}\end{Bmatrix}$ | $[\text{AA}]_a\text{-}(\text{AcAm})_b\text{-}(\text{CH}_2\text{CH})_d$<br>$\text{C=O, N}$ branching into two $\text{CH}_2\text{CH}_2$ arms ending in $\text{N(CH}_3)_2$ groups, with $\text{H(OCH}_2\text{CH}_2)_6\text{OCH-CH}_2$ substituent |

-continued

| Starting Polymer | Starting Chemical Reactant | Anticipated Product Polymer |
|---|---|---|
| $\ce{+AA+_{\overline{a}}+AcAm+_{\overline{b}}}$ | $\ce{H_2NCH_2-CH_2-CH_2}$<br>$\quad\quad\quad\quad\quad\mid$<br>$\ce{O(CH_2CH_2O)_2H}$ | 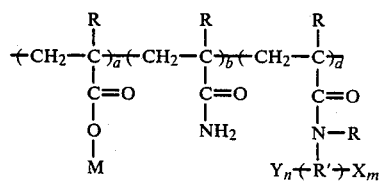 |

T = any terminal group
wherein:
[AA] = acrylic acid
[AcAm] = acrylamide
a, b, d, R, M, have meanings as described above Having described my invention, I claim:

1. A water-soluble pendant substituted amide containing vinylic polymer having a molecular weight of at least 500 which has at least one mole percent of its original pendant amide groups converted to pendant substituted amide structures represented by:

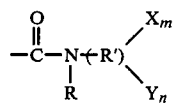

wherein:
R' is a multivalent hydrocarbonaceous bridging group having from 1-20 carbon atoms and which may be linear or branched alkyl; aryl; alkaryl, cyclic, and mixtures thereof;
X is represented by the formula:

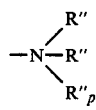

wherein
R'' is a hydrocarbonaceous group chosen, at each occurrence, from linear or branched alkyl, aryl, alkaryl, cyclic,, or two R'' groups taken together to form a ring, alkoxyl groups represented by

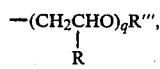

and mixtures thereof provided that when n is zero, at least one R'' is an alkoxyl group represented by

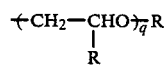

and wherein
p is from 0 to 1, provided that when p is one, an electroneutralizing gegenion is equivalently present;
R''' is individually chosen, at each occurrence, from hydrocarbonaceous groups having from one to twenty carbon atoms and being linear or branched alkyl groups, aryl and alkaryl, and cyclic groups, and mixtures thereof;
Y is chosen, at each occurrence, from the group consisting of —OR''',

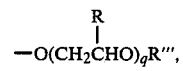

and mixtures thereof;
and wherein
R is chosen, at each occurrence, from hydrogen or a lower alkyl ($C_1$–$C_4$) group, and
q ranges between 1–50; and
m is from 0–20
n is from 0–20, provided the sum, m+n, is at least one.

2. A water-soluble (meth) acrylamide polymer having a molecular weight of at least 500 which has at least one mole percent of its original (meth) acrylamide mer units converted to a structure:

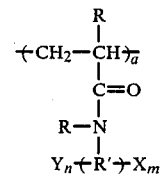

wherein X, Y, R, R', n, and m have the same meanings as appear in claim 1, and a is at least 10.

3. A water-soluble polymer having a molecular weight of at least 500 represented by the structure:

$$\ce{+CH_2-C+_{\overline{a}}+CH_2-C+_{\overline{b}}+CH_2-C+_{\overline{d}}}$$
with pendant groups: C=O, C=O, C=O; O, NH$_2$, N—R; M, , $Y_n\text{+}R'\text{+}X_m$ wherein
R' is a multivalent hydrocarbonaceous bridging group having from 1-20 carbon atoms and which may be linear or branched alkyl; aryl; alkaryl, cyclic, and mixtures thereof;
X is represented by:

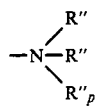

wherein
R" is a hydrocarbonaceous group chosen, at each occurrence, from linear or branched alkyl, aryl, alkaryl, cyclic,, or two R" groups taken together to form a ring, and alkoxyl groups represented by

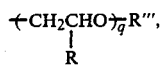

and mixtures thereof, provided that when n is zero, at least one R" is an alkoxyl group represented by

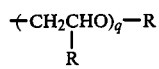

and
wherein
p is from 0 to 1, provided that when p is one, an electroneutralizing gegenion is equivalently present;
Y is chosen, at each occurrence, from the group consisting of —OR"',

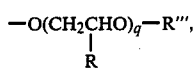

and mixtures thereof;
and
R is individually chosen, at each occurrence, from hydrogen or a lower alkyl ($C_1$-$C_4$) group, and
q individually, at each occurrence, ranges between 1-50; and
m is from 0-20
n is from 0-20, provided the sum, m+n, is 1, and wherein;
R"' is chosen, at each occurrence, from hydrocarbonaceous groups having from one to twenty carbon atoms and being linear or branched alkyl groups, aryl and alkaryl, and cyclic groups, and mixtures thereof;
and wherein
M is chosen, at each occurrence, from the group consisting of hydrogen, lower alkyl ($C_1$-$C_4$) groups, alkali metals, alkaline earth metals, ammonium, primary, secondary, and tertiary amines, and quaternary ammonium groups, and mixtures thereof;
and wherein
(a+b+d), the sum, is sufficient to achieve a molecular weight of at least 500;
and wherein the following relations exist:
the fraction a/b ranges between 0 to 100;
the fraction a/d ranges between 0 to 100;
the fraction (a+b)/d ranges between 0.01 to 100; and
the fraction b/d ranges between 0.01 to 100,
and wherein each mer unit defined by a, b, or d is randomly distributed within the polymer.
4. A water-soluble polymer represented by:

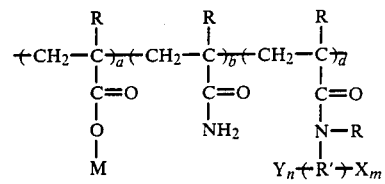

wherein
R is hydrogen or a lower alkyl ($C_1$-$C_4$) group; R' is a multivalent hydrocarbonaceous bridging group having from 2-12 carbon atoms and being chosen from the group consisting of linear and branched alkyl, aryl, alkaryl, cyclic and heterocyclic groups, and mixtures thereof;
X is represented by:

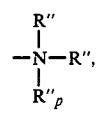

where p is 0 or 1, and where R" is individually chosen, at each occurrence, from a hydrocarbon substitutent having from 1 to 20 carbon atoms and being from the group consisting of linear and branched alkyl, aryl, alkaryl, cyclic groups; and further, R" may also be an alkoxyl group represented by:

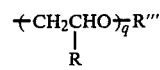

where
q ranges from 1-50, and R"' is individually chosen, at each occurrence from a linear or branched alkyl group, an aryl group, an alkaryl group, a cyclic group, and mixtures thereof; and
Y is chosen from the group —OR"',

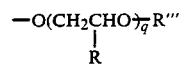

and mixtures thereof;
m is from 0 to 10
n is from 0 to 10, provided the sum (m+n) is from 1 to 12;
and further wherein
(a+b+d), the sum, is sufficient to achieve a molecular weight of from about 1,000 to 20,000,000, and
the fraction a/b ranges from 0 to 100;
the fraction a/b ranges from 0 to 100;
the fraction a+b/d ranges from 0.01 to 100;
the fraction b/d ranges from 0.01 to 100;
and wherein the mer units described by a, b, or d are randomly distributed within the polymer; and M is chosen from the group H, lower alkyl ($C_1$-$C_4$) groups, alkali metal ions, ammonium ions, and mixtures thereof.
5. The water-soluble polymer represented by:

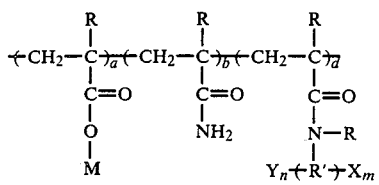

wherein
R is chosen, at each occurrence, from hydrogen or lower alkyl ($C_1$–$C_4$) groups;
R' is a multivalent hydrocarbonaceous bridging group having from 1 to 8 carbon atoms and which is linear or branched alkyl, aromatic, cyclic and mixtures thereof;
X is represented by:

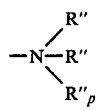

where
p is 0 or 1; and provided when p is 1, an electroneutralizing gegenion is equivalently present; and
R'' is individually chosen, at each occurrence, from a hydrocarbon substituent group having from 1–6 carbon atoms and an alkoxylate substituent represented by

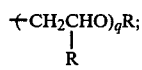

and mixtures thereof, and
where
q ranges from 1–50; and
Y is

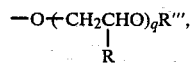

and
R''' is individually chosen, at each occurrence, from hydrocarbonaceous groups having from 1 to 20 carbon atoms and being linear or branched alkyl groups, aryl and alkaryl, and cyclic groups, and mixtures thereof;
M is chosen from H, Li, Na, K, $NH_4$, and mixtures thereof; and
n is from 0 to 8;
m is from 0 to 8, provided the sum, m+n, is from 1–10; and the sum, a+b+d, is sufficient to achieve a molecular weight of at least 1,000, and further that the fraction a/d is from 0 to 100;
the fraction a/b is from 0 to 100;
the fraction (a+b)/d is from 0.1 to 100;
the fraction (b/d) is from 0.01 to 100; and the repeating mer units described by a, b, and d are randomly distributed within the polymer.
6. The polymer of claim 5 wherein:
R is, at each occurrence, hydrogen or methyl groups;
R' is linear or branched alkyl, aromatic and cyclic groups, and mixtures thereof;
X is

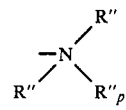

wherein p is 0 or 1 and R'' is a lower alkyl ($C_1$–$C_4$) group or an alkoxyl group represented by:

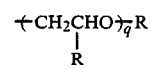

and further,
when p is one, that the gegenion is chosen from the group consisting of chloride, bromide, hydroxyl, and methylsulfate, and mixtures thereof;
and wherein Y is chosen from —OR''',

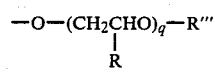

and mixtures thereof, wherein R''' is defined as in claim 1;:
q is from 1 to 25,
m is from 0 to 4,
n is from 0 to 4, provided m+n is from 1–8; and
the fraction (a+b)/d ranges from 0.01 to 50.
7. The polymer of claim 6 wherein:
X is

wherein R'' is a chosen at each occurrence from a lower alkyl ($C_1$–$C_4$) group and an alkoxyl group represented by:

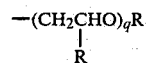

8. The polymer of claim 1 represented by:

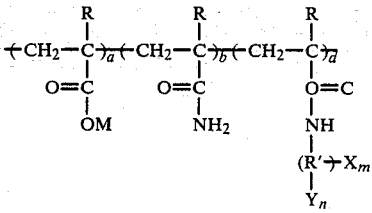

wherein;
R is chosen, at each occurrence, from hydrogen and methyl groups;
R' is a linear or branched alkylene, multi-covalent, bridging group, having from 1 to 6 carbon atoms;
M is chosen, at each occurrence, from H, Li, Na, K, $NH_4$, and mixtures thereof;
X is represented by:

$$-N\begin{matrix}R''\\R''\\R''_p\end{matrix}$$

where p is 0 or 1, and
where
R" is chosen from, at each occurrence, a lower alkyl (C$_1$-C$_4$) group and an alkoxyl group represented by $$-\!\!\!+\!\!CH_2CHO)_qR;$$
$$\quad\quad\quad |$$
$$\quad\quad\quad R$$

Y is $$\quad\quad R$$
$$\quad\quad |$$
$$-O(CH_2CHO)_{\overline{q}}R$$

and q is from 1–30; and
m is from 1–6, and
n is zero to 6, and the sum, m+n, is from 1 to 12; and
wherein
the sum, a+b+d, is sufficient to achieve a molecular weight of at least 1,000; and the fractions, a/b, and a/d both range individually from 0 to 100; and,
the fraction, b/d, is from 0.01 to 100; and,
(a+b)/d is from 0.01 to 100; and the mer units accounted for by a, b, and d are randomly distributed within the polymer.

9. The polymer:

$$\quad\quad R \quad\quad\quad R \quad\quad\quad R$$
$$\quad\quad | \quad\quad\quad | \quad\quad\quad |$$
$$+\!CH_2\!-\!C\!\!+\!\!_a\!+\!CH_2\!-\!C\!\!+\!\!_b\!+\!CH_2\!-\!C\!\!+\!\!_d$$
$$\quad\quad | \quad\quad\quad | \quad\quad\quad |$$
$$\quad\quad O\!=\!C \quad\quad O\!=\!C \quad\quad O\!=\!C$$
$$\quad\quad | \quad\quad\quad | \quad\quad\quad |$$
$$\quad\quad OM \quad\quad NH_2 \quad\quad NR$$
$$\quad\quad\quad\quad\quad\quad\quad\quad\quad\quad |$$
$$\quad\quad\quad\quad\quad\quad\quad\quad (R'\!\!+\!\!Y_n$$

wherein:
R is chosen, at each occurrence, from hydrogen and lower alkyl (C$_1$-C$_4$) groups;
R' is a multi-covalent, linear or branched alkylene bridging group, having from 1 to 6 carbon atoms;
M is chosen, at each occurrence, from H, Li, Na, K, NH$_4$, and mixtures thereof;
Y is —O—(CH$_2$C—RHO)$_q$R''', where R''' is defined as in claim 1, and where q is 1–50;
n is from 1–6, and
the sum, a+b+d, is sufficient to achieve a molecular weight of from 500–20,000,000; and the fractions a/b and a/d individually range from 0 to 100; and the fractions b/d and (a+b)/d individually range 0.01 to 100; and the mer units accounted by a, b, and d are randomly distributed within the polymer.

10. The polymer, having a molecular weight of at least 500, represented by:

$$\quad\quad R \quad\quad\quad R \quad\quad\quad R$$
$$\quad\quad | \quad\quad\quad | \quad\quad\quad |$$
$$+\!CH_2\!-\!C\!\!+\!\!_a\!+\!CH_2\!-\!C\!\!+\!\!_b\!+\!CH_2\!-\!C\!\!+\!\!_d$$
$$\quad\quad | \quad\quad\quad | \quad\quad\quad |$$
$$\quad\quad O\!=\!C \quad\quad O\!=\!C \quad\quad O\!=\!C$$
$$\quad\quad | \quad\quad\quad | \quad\quad\quad |$$
$$\quad\quad OM \quad\quad NH_2 \quad\quad NH$$
$$\quad\quad\quad\quad\quad\quad\quad\quad\quad\quad |$$
$$\quad\quad\quad\quad\quad\quad\quad\quad\quad\quad CH_2$$
$$\quad\quad\quad\quad\quad\quad\quad\quad\quad\quad |$$
$$\quad\quad\quad\quad\quad\quad\quad\quad\quad\quad CH_2 \quad R$$
$$\quad\quad\quad\quad\quad\quad\quad\quad\quad\quad | \quad\quad |$$
$$\quad\quad\quad\quad\quad\quad\quad\quad\quad\quad O(CH_2CHO)_qR'''$$

wherein
R is individually chosen, at each occurrence, from the group consisting of hydrogen and lower alkyl groups having from one to four carbon atoms;
and wherein R''' is chosen at each occurrence from C$_1$-C$_4$ alkyl groups, and
q is from 0 to 50; and,
the sum, a+b+d, is sufficient to achieve a molecular weight of from 1,000–20,000,000.

11. The polymer of claim 1 having molecular weight of at least 500, represented by:

$$+\!CH_2\!-\!CH\!\!+\!\!_a\!+\!CH_2\!-\!CH\!\!+\!\!_b\!+\!CH_2\!-\!CH\!\!+\!\!_d$$
$$\quad\quad | \quad\quad\quad | \quad\quad\quad |$$
$$\quad\quad O\!=\!C \quad\quad O\!=\!C \quad\quad O\!=\!C$$
$$\quad\quad | \quad\quad\quad | \quad\quad\quad |$$
$$\quad\quad OH \quad\quad NH_2 \quad\quad NH \quad CH_3$$
$$\quad\quad\quad\quad\quad\quad\quad\quad\quad\quad |$$
$$\quad\quad\quad\quad\quad\quad\quad\quad Y_n\!\!+\!\!R'\!\!+\!\!N\!\!-\!\!CH_3^+$$
$$\quad\quad\quad\quad\quad\quad\quad\quad\quad\quad | \quad\quad Hal^-$$
$$\quad\quad\quad\quad\quad\quad\quad\quad (CH_2CHO)_qR$$
$$\quad\quad\quad\quad\quad\quad\quad\quad\quad\quad |$$
$$\quad\quad\quad\quad\quad\quad\quad\quad\quad\quad R$$

wherein:
R' is a linear or branched, multivalent, hydrocarbonaceous bridging group containing from 1 to 6 carbon atoms; Hal$^-$ is Cl$^-$, Br$^-$, I$^-$, and mixtures thereof; Y is chosen, at each occurrence, from the group —OR, $$\quad\quad R$$
$$\quad\quad |$$
$$-O(CH_2CHO)_qR,$$

and mixtures thereof;
q ranges from 0–30,
R is H or a lower alkyl (C$_1$-C$_4$) group;
n is from 0 to 6, and
the fractions a/b and a/d range from 0 to 100;
the fractions b/d and (a+b)/d range from 0.01 to 100; and
the mer units accounted by a, b, and d are randomly distributed with the polymer.

12. The polymer of claim 1 having a molecular weight of at least 1000, represented by:

$$+\!CH_2\!-\!CH\!\!+\!\!_a\!+\!CH_2\!-\!CH\!\!+\!\!_b\!+\!CH_2\!-\!CH\!\!+\!\!_d$$
$$\quad\quad | \quad\quad\quad | \quad\quad\quad |$$
$$\quad\quad O\!=\!C \quad\quad O\!=\!C \quad\quad O\!=\!C$$
$$\quad\quad | \quad\quad\quad | \quad\quad\quad |$$
$$\quad\quad OH \quad\quad NH_2 \quad\quad NH \quad R$$
$$\quad\quad\quad\quad\quad\quad\quad\quad\quad\quad | \quad\quad |$$
$$\quad\quad\quad\quad\quad\quad\quad\quad X_m\!\!+\!\!R'\!\!+\!\!+\!\!N.R)_n \quad (Hal)_n^-$$
$$\quad\quad\quad\quad\quad\quad\quad\quad\quad\quad\quad\quad |$$
$$\quad\quad\quad\quad\quad\quad\quad\quad\quad\quad\quad\quad R$$

wherein
R' is a linear or branched, multivalent hydrocarbonaceous bridging group containg from 2–6 carbon atoms; Hal⁻ is chosen from the group, Cl⁻, Br, I⁻, OH⁻, methyl sulfate and mixtures thereof;

X is chosen from the group —OR,

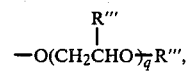

and mixtures thereof;

R is individually chosen, at each occurrence, from methyl, ethyl, propyl, butyl and isomers thereof;

R''' is chosen from the group hydrogen and lower alkyl ($C_1$-$C_4$) groups;

m ranges from 0 to 4;

n ranges from 1 to 4; and, the fractions, a/b and a/d, range from 0 to 100;

the fractions, b/d and (a+b)/d, range from 0.01 to 100;

and the mer units accounted by a, b and d are randomly distributed within the polymer.

* * * * *